(12) United States Patent
Naske et al.

(10) Patent No.: US 8,212,810 B2
(45) Date of Patent: Jul. 3, 2012

(54) METHOD AND DEVICES FOR CALIBRATING A DISPLAY UNIT COMPRISING A DISPLAY AND AUTOSTEREOSCOPIC ADAPTER DISC

(75) Inventors: Rolf-Dieter Naske, Kakenstorf (DE); Gabriela Cochius, Diessen (DE); Ivo-Henning Naske, Kakenstorf (DE)

(73) Assignee: Eduard Paul Rauchdobler, Kefemarkt (AT)

( * ) Notice: Subject to any disclaimer, the term of this patent is extended or adjusted under 35 U.S.C. 154(b) by 457 days.

(21) Appl. No.: 12/297,876

(22) PCT Filed: Mar. 27, 2007
(Under 37 CFR 1.47)

(86) PCT No.: PCT/EP2007/002666
§ 371 (c)(1),
(2), (4) Date: Oct. 28, 2009

(87) PCT Pub. No.: WO2007/121819
PCT Pub. Date: Nov. 1, 2007

(65) Prior Publication Data
US 2011/0164028 A1 Jul. 7, 2011

(30) Foreign Application Priority Data
Apr. 21, 2006 (DE) .......................... 10 2006 019 169

(51) Int. Cl.
G06T 15/00 (2011.01)
(52) U.S. Cl. ............ 345/419; 348/59; 348/42; 359/463; 359/462
(58) Field of Classification Search .................... 348/59, 348/54, 42; 359/463, 462
See application file for complete search history.

(56) References Cited

U.S. PATENT DOCUMENTS

| 5,493,427 | A | | 2/1996 | Nomura et al. | |
|---|---|---|---|---|---|
| 5,966,167 | A | * | 10/1999 | Nose et al. | 348/59 |
| 6,055,013 | A | * | 4/2000 | Woodgate et al. | 348/59 |
| 6,801,243 | B1 | * | 10/2004 | Van Berkel | 348/59 |
| 6,816,158 | B1 | * | 11/2004 | Lemelson et al. | 345/419 |
| 2002/0147795 | A1 | * | 10/2002 | Cantwell | 709/220 |
| 2004/0008251 | A1 | * | 1/2004 | Mashitani et al. | 348/51 |
| 2004/0100464 | A1 | * | 5/2004 | Oh et al. | 345/419 |

FOREIGN PATENT DOCUMENTS
DE   102 52 830 B3   5/2004
WO   0162014 A   8/2001

OTHER PUBLICATIONS

L. G. Commander, S. E. Day, D. R. Selviah, "Variable focal length microlenses", Optics Communications, vol. 177, Issues 1-6, Apr. 15, 2000, pp. 157-170.*
International Search Report for corresponding International Application PCT/EP2007/002666.

* cited by examiner

Primary Examiner — Javid A Amini
Assistant Examiner — Fikru Gennene
(74) Attorney, Agent, or Firm — WRB-IP LLP

(57) ABSTRACT

A method and a device for calibration (or "electronic" adjustment) of a display unit are provided and include a display and autostereoscopic adapter disc, particularly provided for fixing to the display. A method and a device for generation or playback of 3D images by the display unit including autostereoscopic adapter disc and display are also provided. Misalignment of the adapted disc with the display are compensated for by corresponding adjustment of the image display on the display.

17 Claims, 11 Drawing Sheets

METHOD AND DEVICES FOR CALIBRATING A DISPLAY UNIT COMPRISING A DISPLAY AND AUTOSTEREOSCOPIC ADAPTER DISC

BACKGROUND AND SUMMARY

The invention concerns a method and device for the calibration (or "electronic adjustment") of a display unit, comprising a display and autostereoscopic adapter disc, particularly provided for detachable mounting to the display. The invention furthermore concerns a method and a device for the generation or playback of 3D images by means of said display unit comprising an autostereoscopic adapter disc and display. The invention finally concerns an autostereoscopic adapter disc that is especially suitable for the use with these methods and devices.

Adapter discs of this type are known, for example, in the form of lenticular screen discs, lenticular discs, liquid lense discs or nano-lense discs that generally are comprised of layers of multiple individual discs and are placed on the screen surface of a display. Such a display unit comprised of an adapter disc and a display can be used to provide each eye of a viewer with a different perspective without any visual aid (for example polarization glasses or similar objects) to produce a three-dimensional (3D) image effect.

The embodiment of the adapter disc in particular can be such that according to FIG. 1 several viewers B1 . . . Bn can simultaneously see a three-dimensional (3D) image with spatial depth from different angles or positions and distances, respectively, from the system DA comprised of adapter disc and display. Such systems therefore are also called multiview systems.

An adapter disc for the detachable mounting to the screen surface of a (conventional) display by means of a simple fixing device is preferred.

One advantage of such detachable adapter discs is that the display can be used in a customary manner for common applications such as word processing, for example, and, if required, three-dimensional viewing of corresponding images or image sequences after the adapter disc is put in place is possible. Thus customary displays can be upgraded for three-dimensional viewing by means of the adapter disc so that multifunctional displays can be realized in a simple manner.

However, one common problem in particular with multiview systems is that there is insufficiently exact alignment between the optical and physical features of the display and the optical and physical features of the attached adapter disc since the adapter disc, due to its detachable mounting on the display, cannot be positioned on the display with the required degree of accuracy and reproducibility.

DE 102 52 830 B3 describes a detachable autostereoscopic adapter in the form of a removable lenticular screen disc for a flat screen which includes an automatic calibration of the adapter on the display by means of an electronic sensor device.

However, this solution generally is not considered to be very efficient since either the sensor device does not work accurately enough due to external influences or is relatively expensive, which results in corresponding cost disadvantages.

It is desirable to provide a method and a device for calibrating a display unit, comprising a display and an autostereoscopic adapter disc, particularly provided for detachable mounting on the screen surface of the display, which reliably adjusts and aligns the optical or physical features of the display with the optical and physical features of the attached adapter disc depending on the actual relative positioning between the two.

It is also desirable to provide a method and a device for generating or playing back, respectively, 3D images by means of a display unit as described above.

Finally, it is desirable to provide an adapter disc that is especially suitable for application to these methods and devices.

One advantage of solutions according to aspects of the present invention is that an optimal three-dimensional (3D) image playback can be achieved in a relatively simple manner, as it is customarily possible only with autostereoscopic adapter discs that are permanently mounted on the surface of the display by the manufacturer.

The sub-claims contain further advantageous developments of aspects of the invention.

BRIEF DESCRIPTION OF THE DRAWINGS

Additional details, features and advantages of the invention are disclosed in the following description of exemplary and preferred embodiments of the invention based on the drawing. The following is shown.

DETAILED DESCRIPTION

Figure 1:
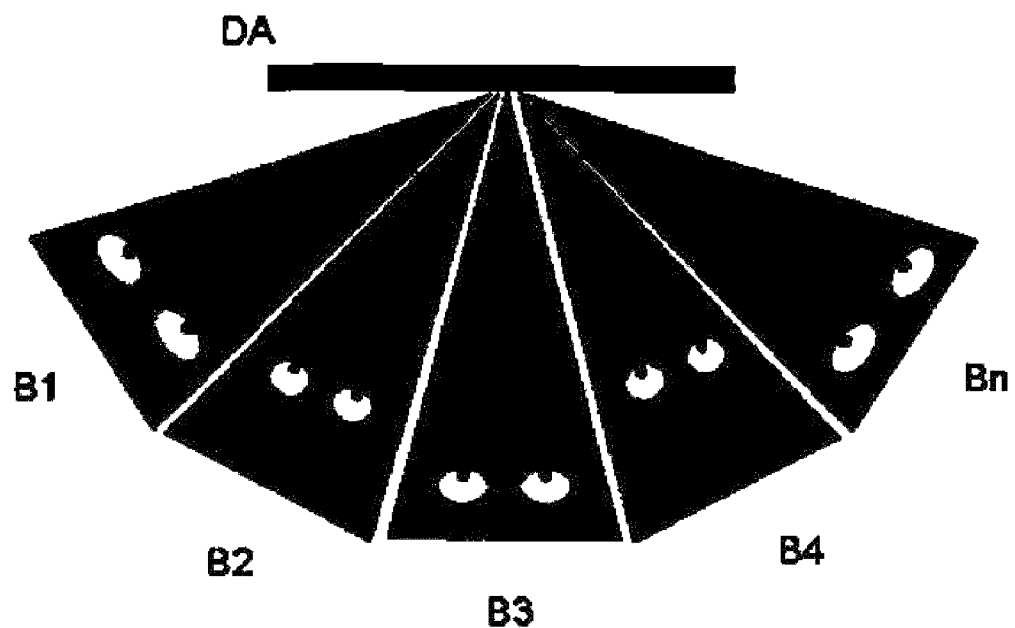
FIG. 1 shows a schematic presentation of the positions and viewing angles of different viewers in multiple viewing zones of a display with an autostereoscopic adapter disc.

In an adapter disc that is permanently mounted, all optical and physical parameters are defined and substantially unchangeable so that the playback of images can be set relative to these parameters as well. These parameters are important in particular for defining which perspective n is to be displayed on which pixel or sub-pixel of the display.

In this context it must be mentioned that the pixel of an image (image element) in general is comprised of three sub-pixels, one each for the base colors red, green and blue (RGB). The method according to the invention can be executed on the pixel level as well as on the sub-pixel level. To this extent all explanations apply to both alternatives.

Based on the laws of optics and, for example, U.S. Pat. No. 4,668,063, a selected perspective n is based on the following formula:

$$n = (i + i_{off} - 3j \tan \alpha) \bmod X * N_{tot}/X. \quad (1)$$

In this formula: n=selected perspective,
i=horizontal index of a pixel or sub-pixel, i=1, ..., I
$i_{off}$=lateral shift of the adapter disc, based on the pixel or sub-pixel that is furthest to the left or right, i.e., the pixel or sub-pixel on the lateral edge of the display;
j=vertical index of a pixel or sub-pixel, j=1, ..., J
α=angle of the lenticular lenses of the adapter disc,
X=number of pixels or sub-pixels, respectively, behind a lense of the adapter disc (views per lens),
mod X=modulo X
$N_{tot}$=total number of the perspectives to be displayed.

In a detachable adapter disc certain parameters such as, for example, the focal distance f of the lenticular lenses and their widths $p_{L}$, as well as the size of the physical pixels $p_{h}$ or sub-pixels on the display, are defined and cannot be changed.

Other parameters (e.g., the angle α of the lenticular lenses of the adapter disc (i.e., in particular a rotation of the adapter disc around an axis that is perpendicular to the plane of the display), a shift $i_{off}$ of the adapter disc parallel to the plane of the display, in particular in lateral direction relative to a lateral edge of the display, as well as the exact distance d of the adapter disc, i.e., of the lenticular lenses, from the display), however, cannot be defined exactly.

They are substantially determined by the tolerances of the mounting device of the adapter disc or the display, respectively, and the related, varying positioning of the adapter disc on the display. For example, the adapter disc can be lightly jammed in the display recess since it must have a certain clearance as well, otherwise the adapter disc is not exactly plane on the display surface since it can experience a certain curvature due to the radiation of heat.

With the method according to the invention or with the device according to the invention, such an inaccurate positioning (misalignment) or an undesirable change of the positioning of the adapter disc (e.g., due to jolts, temperature changes or similar things) relative to the display, i.e., in particular the lenticular lenses of the adapter disc relative to the pixels or sub-pixels of the display below, can be compensated for and thus a calibration or ("electronic") adjustment of the adapter disc can be achieved so that the image shown on the display is changed in relation to different optical and physical parameters (in particular α, $i_{off}$ and X according to formula (1) above) and thus is adjusted to the actual position of the adapter disc. Which and how many parameters are selected is substantially determined by the degree of accuracy with which the adapter disc can be positioned on the display and by the degree of the required image quality.

In doing so, however, the image elements of the image are not addressed individually, but rather (screen) masks M are defined with which the individual perspectives n that are to be displayed are multiplied and then are added to provide an overall image. The number N of the masks M thereby preferably corresponds to a desired number $N_{tot}$ of perspectives n that are to be displayed.

In doing so, the individual image elements (pixels or sub-pixels), as mentioned, are not addressed individually but rather are processed in parallel based on elementary operations such as additions and multiplications.

Figure 12:
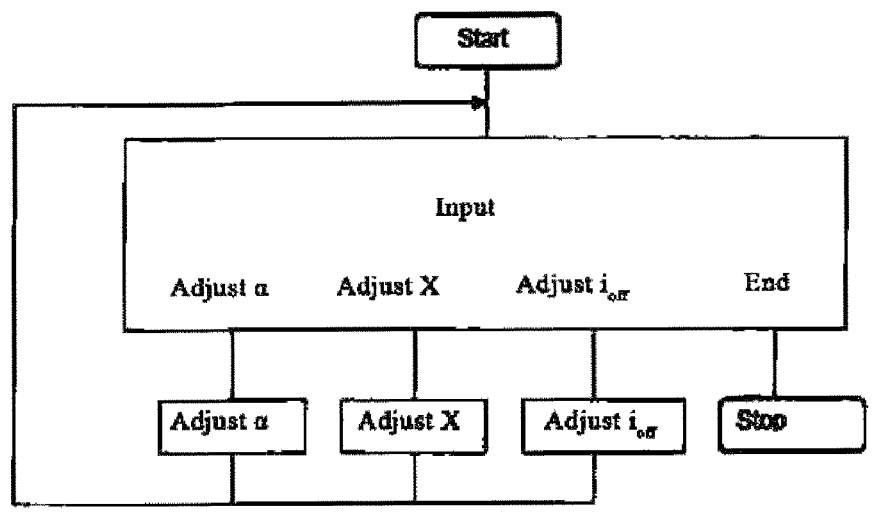
FIG. 12 shows a schematic flow chart for calibrating flute parameters.

The above-mentioned inaccuracies of the positioning of the adapter disc in particular affect parameters α, $i_{off}$, and X, according to the above formula (1), and are newly adjusted or calibrated or fine-tuned according to the invention as shown in FIG. 12. In particular, input from the user, and thus interactive optimization, is thereby possible, so that the optical parameters can be individually adjusted to physical conditions. Preferably a test image is shown on the display that helps the user to optimize the parameters to carry out the method.

On the other hand, input values can be generated by appropriate sensor assemblies for recording the respective parameters.

The method according to the invention preferably is executed with the help of a computer program.

The first parameter to be set that is to be described is the determination and ("electronic") adjustment or calibration, respectively, of the actual angle α of the lenticular lenses of the adapter disc relative to the value that is defined by the display:

In a multiview display, according to FIG. 1, there are multiple viewing zones in front of the combined system of display and adapter disc DA. A viewer B1, B2, ... Bn can see an optimal spatial image in each viewing zone.

Figure 2:
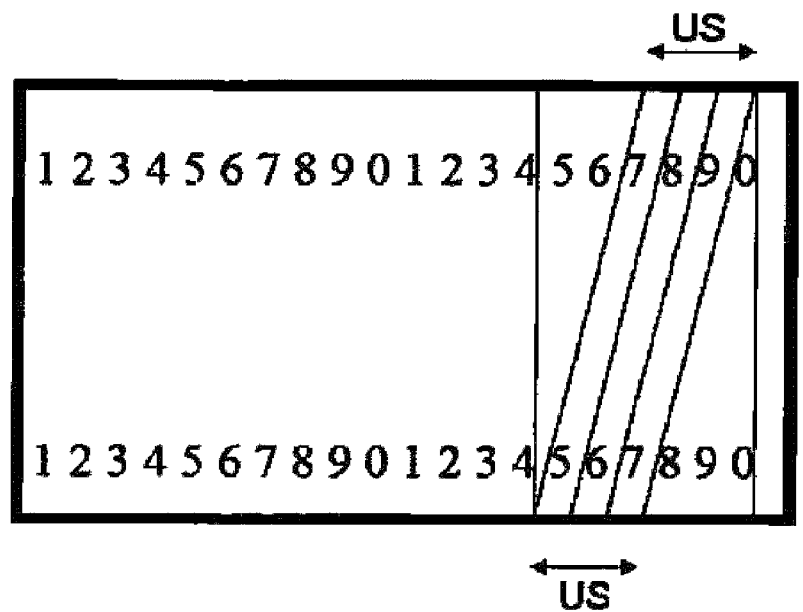
FIG. 2 shows a schematic presentation of a multiview display with multiple blurred lines that run diagonally.

However, if a viewer moves in front of the display or travels from one viewing zone to an adjacent one, a blurred line (also called blurred zone or transition zone) travels through the image. If the theoretical, required diagonal position of the lenses does not correspond exactly to the actual, physical diagonal position of the lenses of the adapter disc, this blurred line US is not vertical but rather is slightly tilted or diagonal across the image, as shown in FIG. 2. In this case the transition zone between two viewing zones is especially wide. This can easily be seen on the test image. The test image, according to FIG. 2, for example, is comprised of a number sequence that is displayed at the top and at the bottom of the display. If the diagonal position of the lenses is not optimal (because the adapter disc is slightly jammed or positioned in a rotated position, for example) different numbers at the top and bottom are simultaneously blurry. In the example in FIG. 2 these are the numbers 7, 8, and 9 along the top edge of the display for example, and the numbers 5, 6, and 7 along the bottom edge of the display so that the entire transition zone at the top and at the bottom extends between the numbers 5 and 0 and thus is relatively wide.

Figure 3:
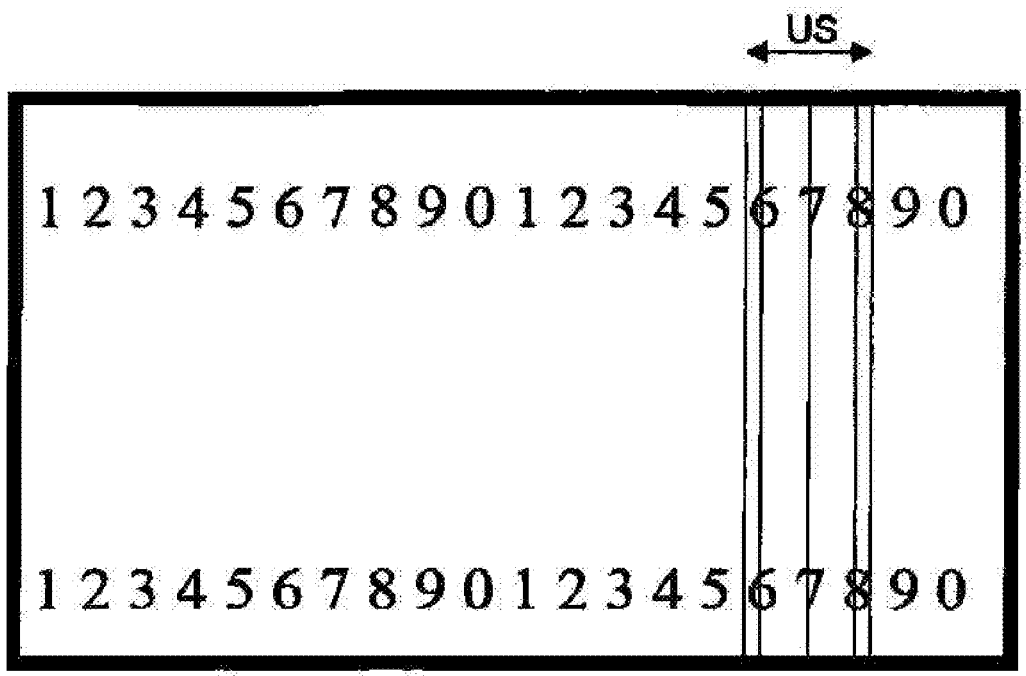
FIG. 3 shows a schematic presentation of a multiview display with multiple blurred lines that run vertically.

Using input (see FIG. 12), for example, from a viewer using two entry keys or from a corresponding sensor device for recording the inclination of the blurred line US, the theoretical diagonal position α, whose starting value is defined by the type of display, now is changed (i.e., calibrated, adjusted or aligned) by changing the image until the numbers 6, 7, and 8 are blurry at the top and the bottom, for example (ref. FIG. 3). The blurred zone US now is minimal.

The calibration or adjustment of this parameter α thus is comprised of changing the theoretical diagonal position of the lenses that is required by the display, whose starting value is defined, until the same numbers are blurred on the top and the bottom according to FIG. 3 by changing the image on the display and thus the transition zones US have a minimal width.

Figure 13:
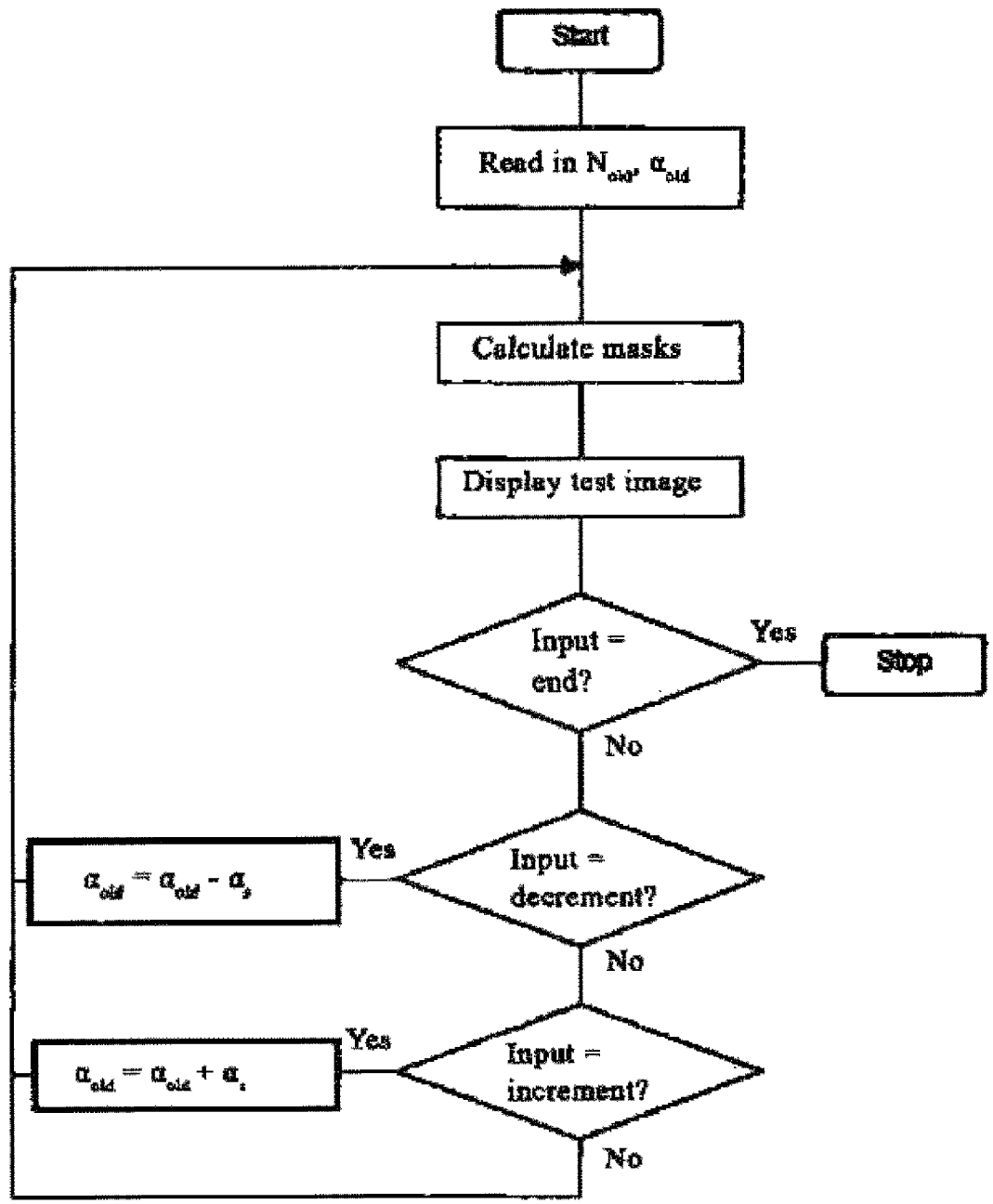
FIG. 13 shows a schematic now chart for calibrating a first parameter.

As a starting value for the diagonal position an angle of e.g., −13.0 degrees is defined or set. The step width $α_s$ for changing this angle (e.g., based on the entry keyed in by the user) generally is 0.01 degrees. In practical applications an optimal angle proved to be a value ranging between approximately −12.95 and approximately −13.2 degrees. This is the fluctuation range that generally results due to the fastening of the adapter disc on the display by the user. A flow chart for adjusting α is shown in FIG. 13.

Figure 4:
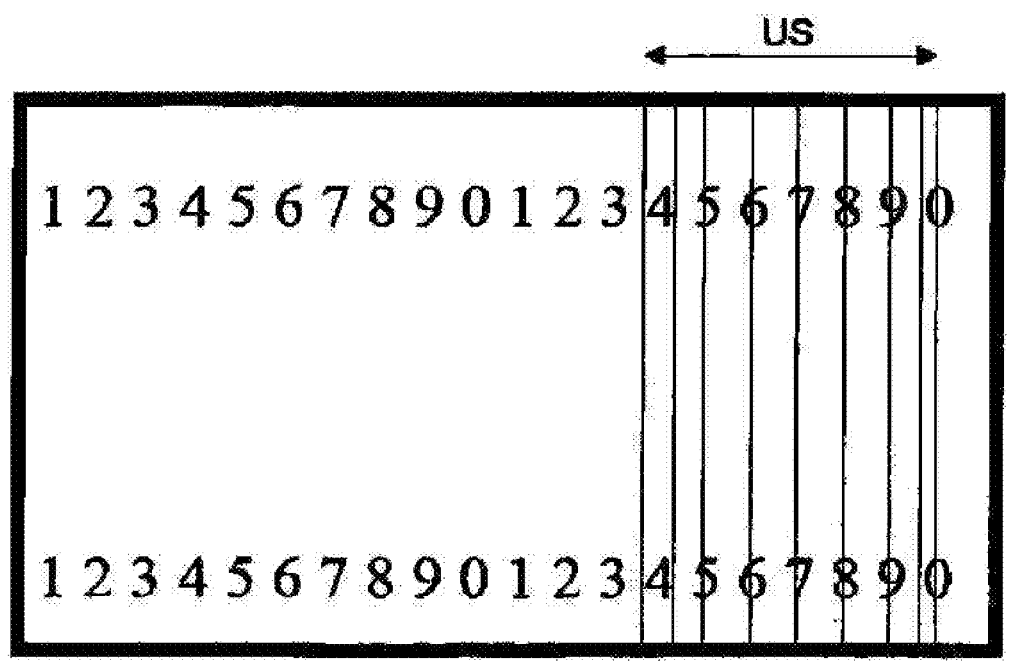
FIG. 4 shows a schematic presentation of a multiview display with multiple relatively wide blurred lines.

The second parameter to be set or calibrated that is to be described is the determination and adjustment of the actual distance d of the lenticular lenses of the attached adapter disc from the display in relation to a value defined by the display:

For this second optical parameter the distance d of the lenticular lenses from the display affects the width of the blurred line US via the number X of pixels or sub-pixels of the display behind a tense of the adapter disc. If the theoretical distance, whose starting value also is defined by the display, does not correspond to the actual distance, the blurred line US according to FIG. 4 is larger than required, since the magnification factor is not precisely adjusted.

Figure 5:
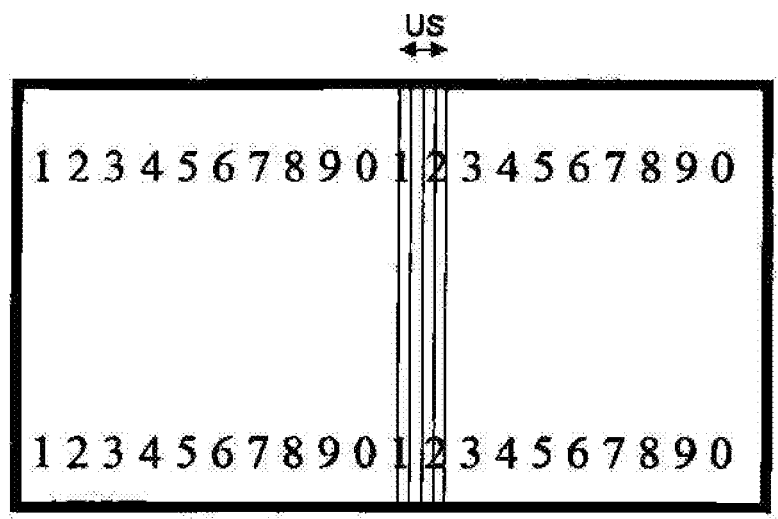
FIG. 5 shows a schematic presentation of a multiview display with multiple blurred lines with minimal width.

The calibration or adjustment (i.e., setting) of this parameter d entails changing a value X of the number of pixels or sub-pixels of the display behind at least one tense of the adapter disc that is defined by the theoretical or target distance d on the display until the blurred line US has a minimal width according to FIG. 5.

Figure 14:
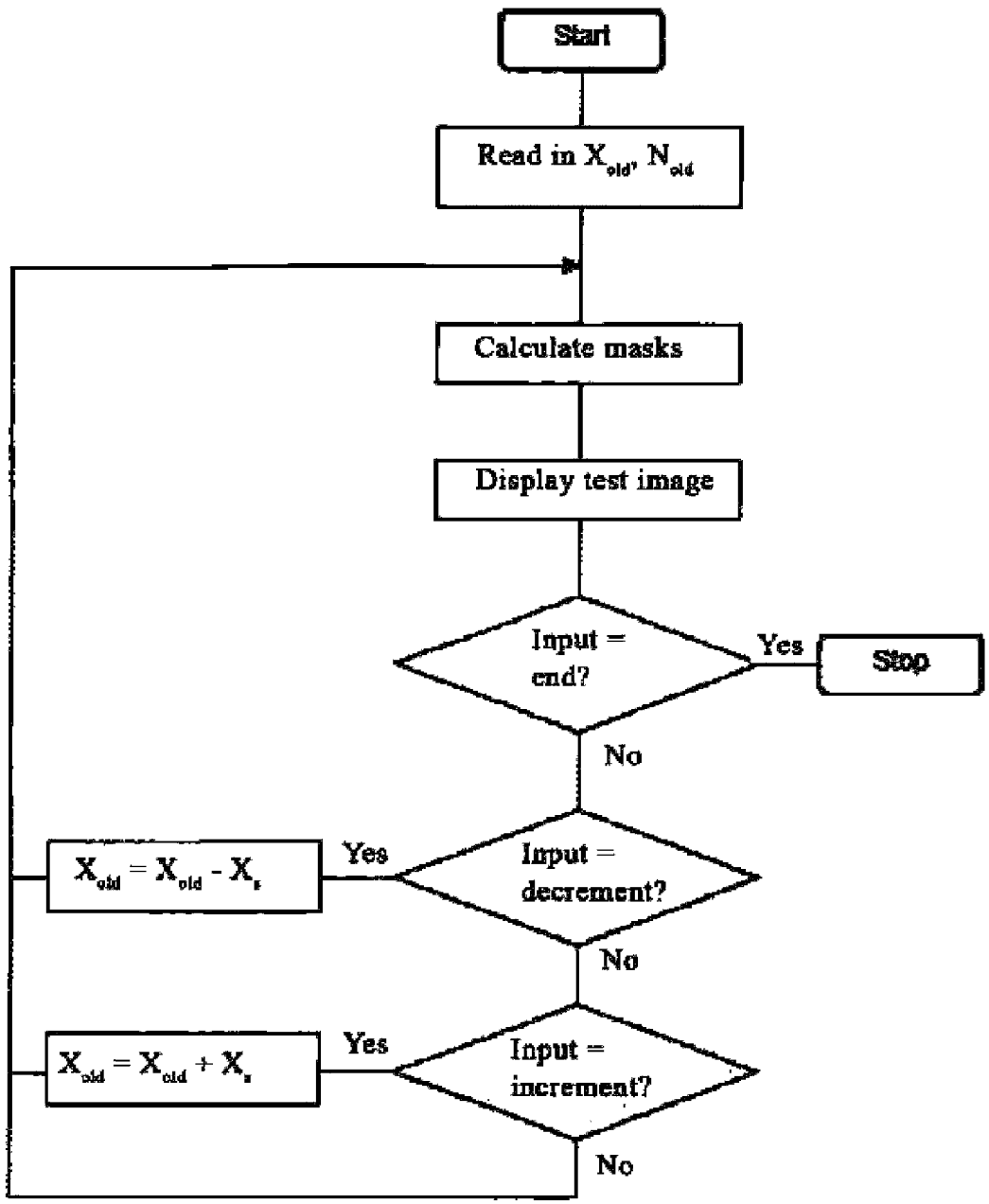
FIG. 14 shows a schematic flow chart for calibrating a second parameter.

Value X, as shown above, is determined by the focal distance f and the width of the lenses $p_μ$ of the adapter disc as well as the size of the physical pixels $p_h$ on the display. These variables are fixed and known. However, the distance d from the display can vary. For example, today's LCD displays have a pixel distance of 0.19 mm to 0.26 mm. This results in starting values for the number X of pixels behind the lense of the adapter disc of 6 to 12. The step width $X_S$ is set to 0.001 due to reasons of sensitivity. However, it can be changed. FIG. 14 shows a flow chart for adjusting X.

The setting (or adjusting or calibrating) of this parameter d via value X can be accomplished by a viewer providing input using two keys and with the help of the test image, or by using an appropriate sensor device for recording the width of the blurred line US.

The third parameter to be set or calibrated that is to be described is the determination of the lateral shift $i_{off}$ of the adapter disc, based on the pixel or sub-pixel of the display that is furthest to the left or right (i.e., on the lateral edge) and whose adjustment or setting affects the spatial position of the viewing zones.

Figure 15:
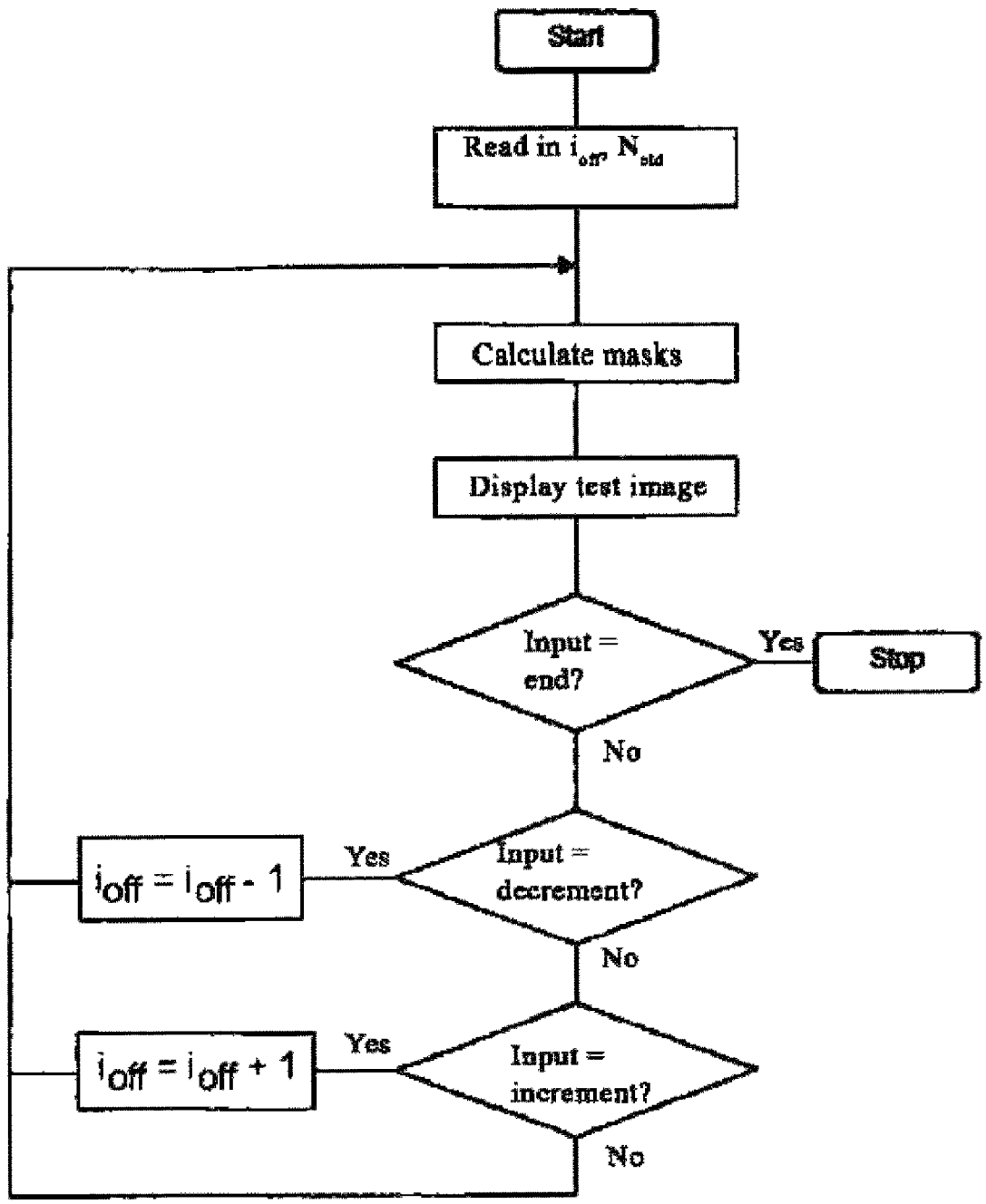
FIG. 15 shows a schematic flow chart for calibrating a third parameter.

The starting value of parameter $i_{off}$ again is defined by the display. By changing parameter $i_{off}$, the viewing zones can be positioned so that a viewer that is right in front of the display is in exactly one viewing zone and has an optimal, three-dimensional image impression. Since the masks M can only be shifted by whole pixels or sub-pixels, a value of $i_{off}=0$ is set, that can be shifted to the left or the right in pixel or sub-pixel steps. FIG. 15 shows a flow chart for adjusting $i_{off}$.

The setting (or adjusting or calibration) of this third parameter $i_{off}$ again can be accomplished by a viewer providing input using two keys and with the help of a test image, or by using an appropriate sensor device for recording the lateral position of the viewing zones.

Once the adapter disc is mounted on the display and once the parameter calibrations are carried out in accordance with the descriptions above, N perspectives of an image or video can be displayed on the display unit.

As already explained above, this process does not address the individual image elements of the display, but rather a number N of masks M is defined in the following form:

$$M_n(i,j)= \begin{cases} 1, \text{if image element } i,j \text{ is to be displayed from perspective } n, \\ 0, \text{otherwise,} \end{cases}$$

for $n=1, \ldots N$ and $i,j$ from the image range. (2)

Figure 11:
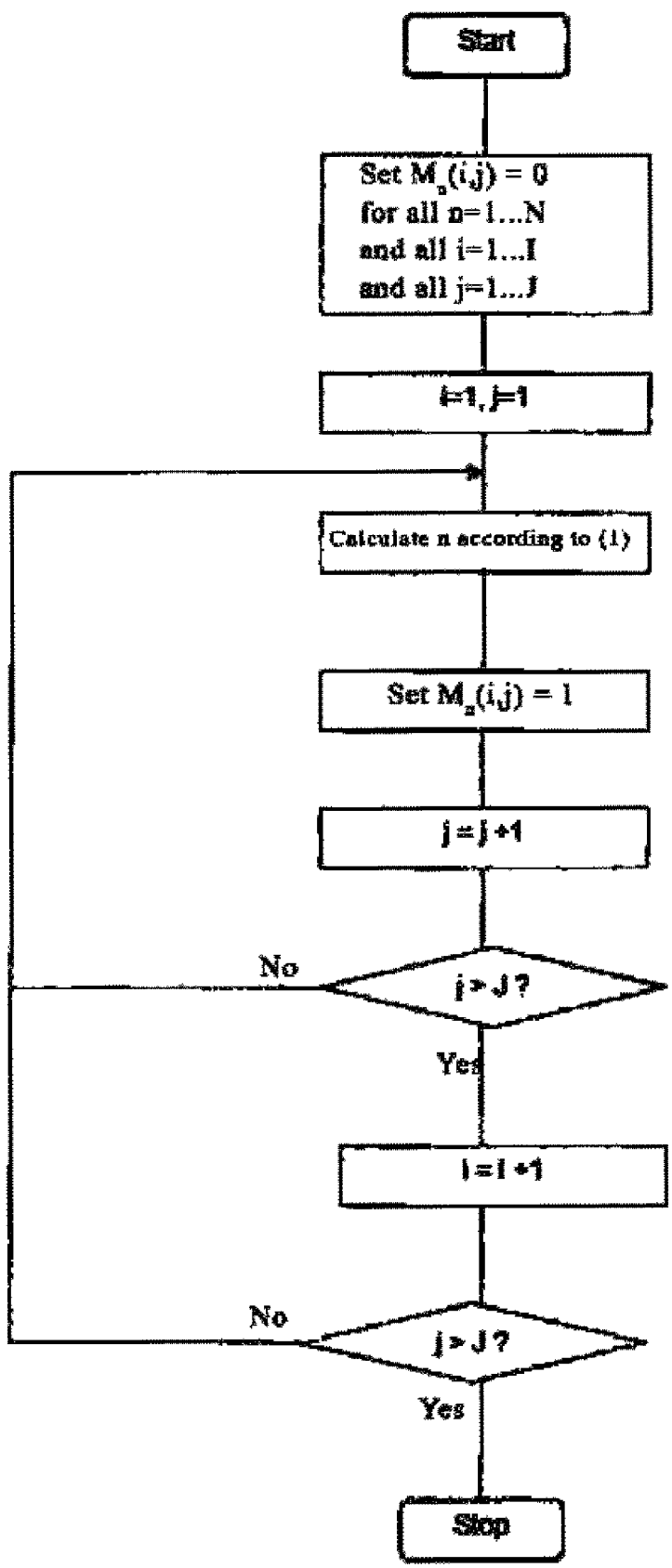
FIG. 11 shows a schematic flow chart for generating screen masks.

The flow chart in FIG. 11 shows the realization of a corresponding mask generator, including the calculation of the perspectives according to the above formula (1).

These masks M are calculated once using the above formula (2) and then are applied as follows:

Each perspective $P_n(i, j)$ is multiplied by the respective mask $M_n(i, j)$:

$$B_n(i,j)=P_n(i,j)*M_n(i,j), \text{for } n=1, \ldots N \text{ and } i,j \text{ from the image range.} \quad (3)$$

The final image results from the addition of the masked perspectives:

$$P(i,j)=\Sigma P_n(i,j), \text{with } i,j \text{ from the image range.} \quad (4)$$

Since this means that individual image elements are not extracted and addressed, this process is substantially easier and faster than the method described in U.S. Pat. No. 6,801,243, for example.

Image P (i, j) is then shown on the display.

Figure 10:
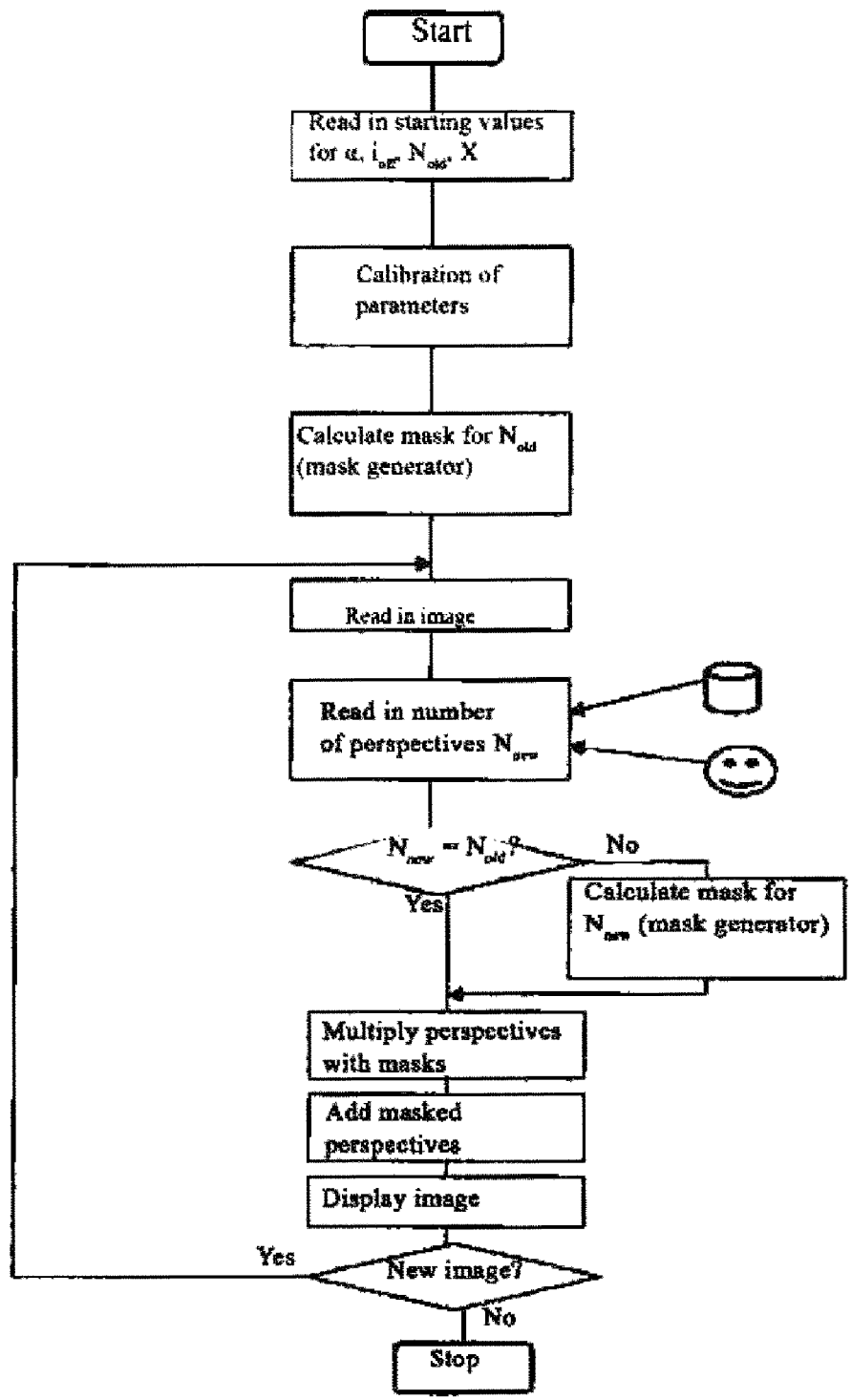
FIG. 10 shows a flow chart of the process of a method according to the invention for generating 3D multiview images, including the calibration and generation of screen masks according to a number of perspectives selected by the viewer.

The viewer can freely select the number N of perspectives, which can also be changed dynamically. This results in new masks M automatically being generated according to the new number N of perspectives. The flow chart in FIG. 10 shows this generation of masks as part of the entire method for the image generation or image playback.

The method according to the invention preferably is executed using a computer program.

Figure 8:
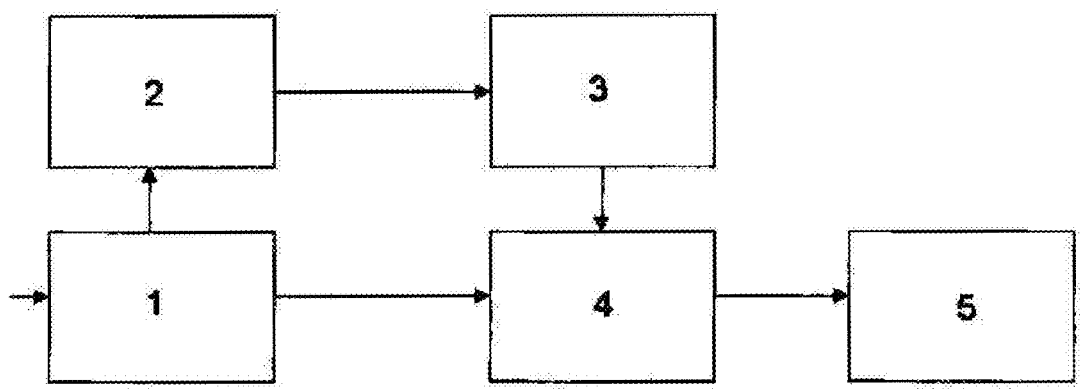
FIG. 8 shows a schematic block diagram of a device for generating 3D multiview images by means of an autostereoscopic adapter disc and a display for generating screen masks.

FIG. 8 shows a block diagram of a corresponding device for executing the method using an image memory 1 to which the images that are to be displayed are sent, a mask generator 2 for generating the masks, a mask memory 3 for storing the generated masks, and a mask operator 4 for multiplying the perspectives of the image to be displayed with the respective mask, as well as a display 5 on which the image is played back.

The same principle can be applied to the display of virtual images, in particular computer games. In this case the images do not explicitly exist, but are generated during the render process as a function of the position and viewing direction of the player in a virtual environment. However, after that the process progresses as described above.

Figure 9:
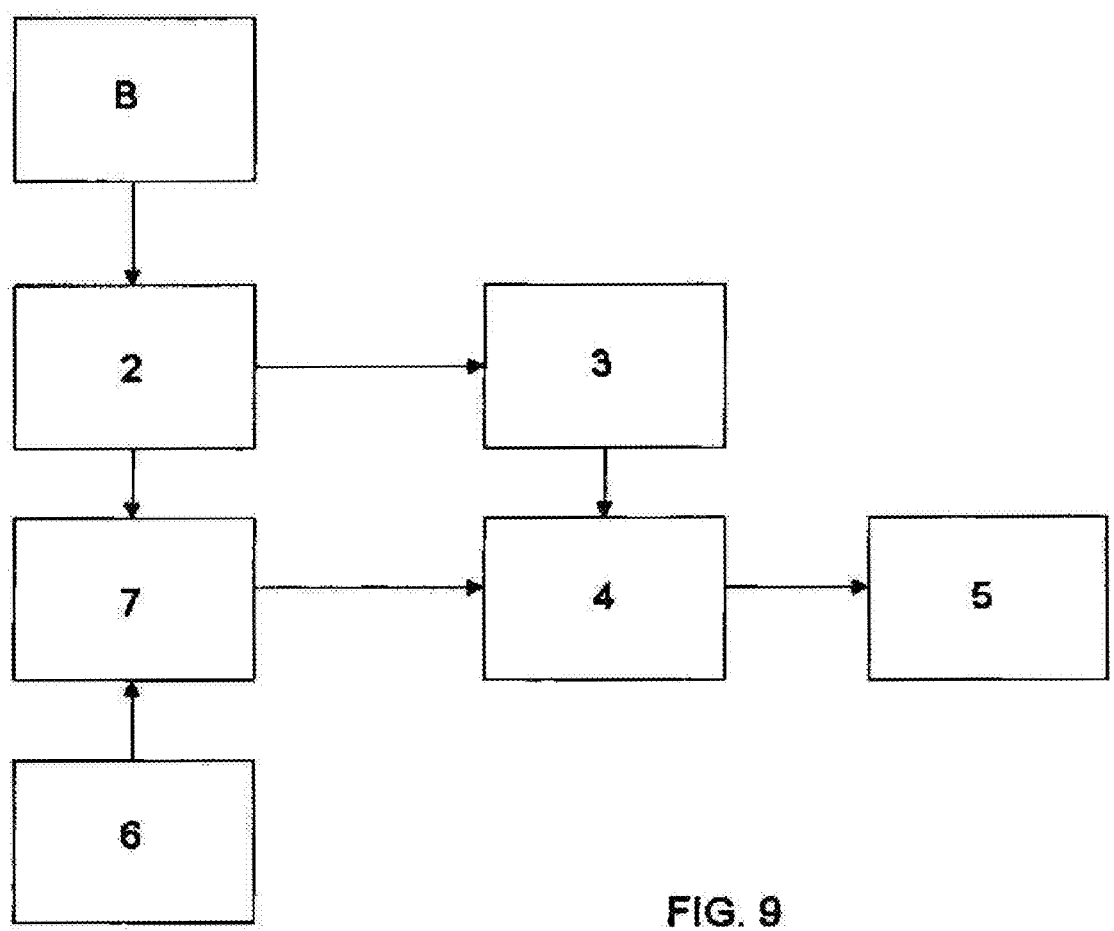
FIG. 9 shows a schematic block diagram of a device for generating 3D multiview images by means of an autostereoscopic adapter disc and a display for playing back synthetically produced images such as, in particular, computer games.

FIG. 9 shows a block diagram of a corresponding device for carrying out this method. Instead of the image memory 1 from FIG. 8, there is a geometry and texture memory 6 as well as an image generator 7, with the mask generator 2 being supplied with the position and viewing direction of a viewer or player B.

The following paragraphs provide three preferred embodiments of autostereoscopic adapter discs that can be preferably used in the methods and devices according to the invention.

Instead of fixed or rigid lenses of a customary adapter disc, in particular so-called "liquid lenses" can be used. In this case each liquid range of a lense is activated by applying a certain voltage to an enclosed liquid. The voltage produces a convex surface that has the properties of a lense. The variation in the voltage can be used to vary the optical properties of the liquid lense. This makes it possible to vary the optimal viewing range. It can be set for a viewer who sits right in front of the display or for viewers that are located at a greater distance. The autostereoscopic effect can be turned on and off by turning it on and off.

Additionally, or alternatively to the above described changes of the image shown on the display for compensating the parameters indicated, a misalignment of the adapter disc on the display can also be compensated by changing the optical properties of the liquid lenses of the adapter disc.

Attaching and detaching the adapter disc in the above cases is no longer required. It can also be mounted in a fixed manner.

From the field of nanotechnology, how to create and edit fine molecular structures is known. This technology can be used not to work with large lenticular lenses that reach from the top edge of the display to the bottom edge, but rather to construct a lense for each pixel on the display.

Nanotechnology can also be combined with the above described liquid lense technology. In this case one individual electronically controllable lense is on top of each pixel (RGB color) or sub-pixel (only R, G, or B color).

Figure 6:
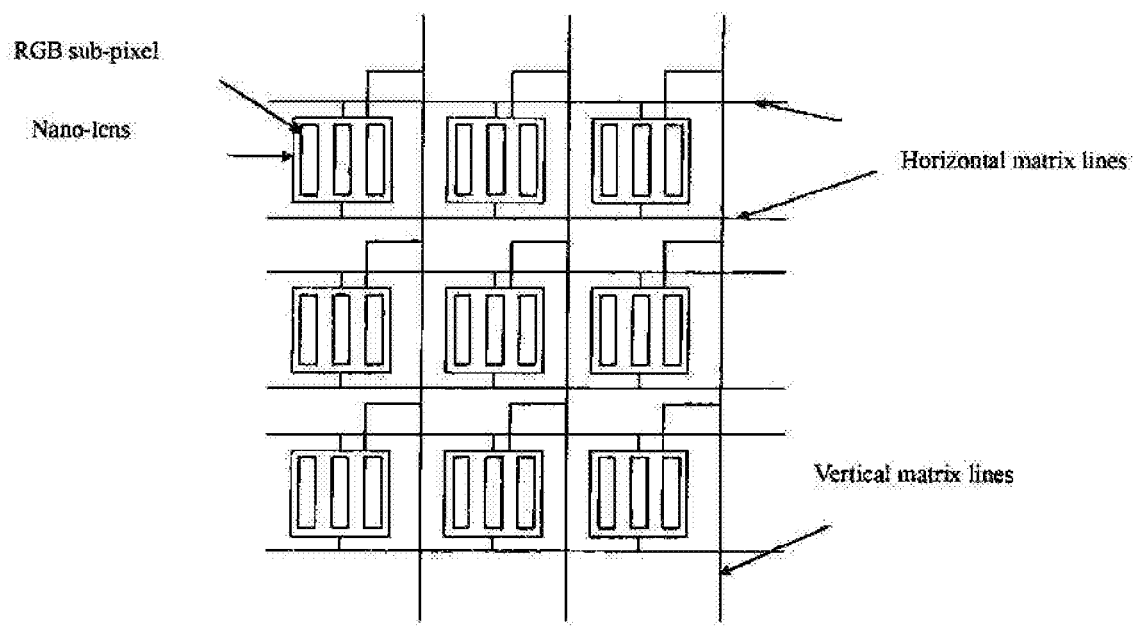
FIG. 6 shows a schematic presentation of a matrix circuit for controlling each tense of an adapter disc via a pixel or sub-pixel of a display.

Using the matrix circuit shown in FIG. 6, each lense can be controlled individually on top of the desired pixel or sub-pixel.

Figure 7:
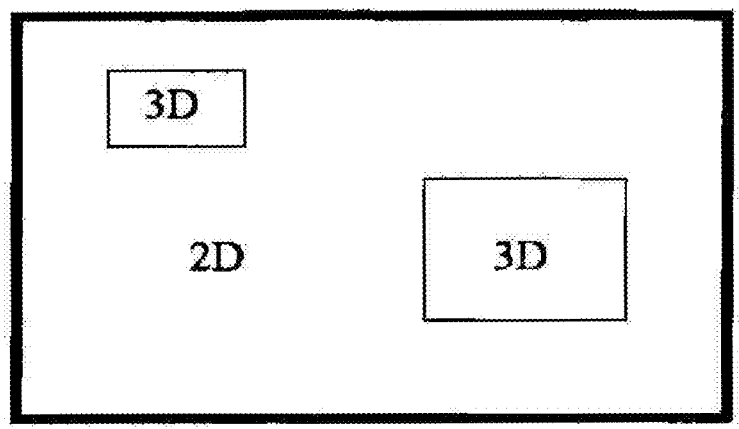
FIG. 7 shows a schematic presentation of a display with ranges for two-dimensional or three-dimensional presentation of images.

Since each pixel can be controlled individually, it also is possible to switch individual areas of the display to the 3D mode according to FIG. 7, while other areas only display 2D information. To this end, the on and off impulse is sent in sequence by line and column for each viewpoint. The lense is turned on or off only if the horizontal and vertical impulses are simultaneously applied to a lense.

The strip conductors run directly over the display. However, they are not visible, but can be comprised of transparent, organic semi-conductors.

This principle is to be called "nano-lenses." The disc with the nano-lenses in this case no longer must be detachable, but can be mounted on the display in a fixed position.

Finally, the above described technology can be used for more than just displays. Since organic semi-conductors can be printed on almost any substrate and relatively robust print methods can be used for the production of organic circuits, these OLEDs with the transparent circuits and nano-lenses can also be printed on screens and other materials.

The same methods as described above can be used for the generation or presentation of the N perspectives. Since, however, the ability to detach could result in not reaching the required degree of precision and since the autostereoscopic adapter screen would be too large, there is no flexible attachment and detachment in this case.

As described above however, the lenses can be turned on and off so that the screen can also be used for standard digital 2D movies.

Figure 16:
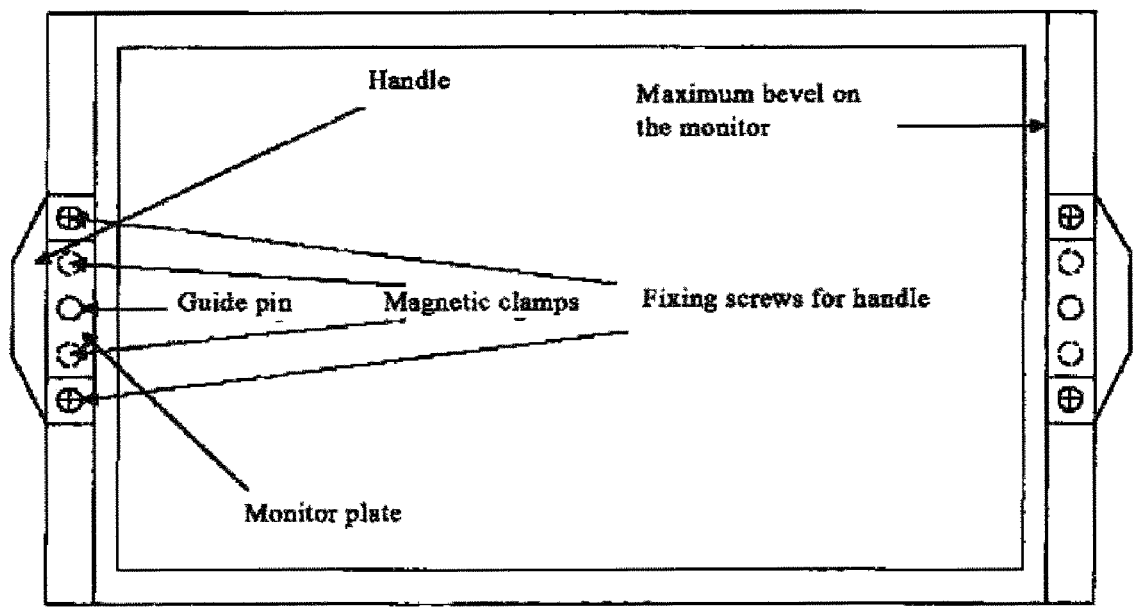
FIG. 16 shows a schematic presentation of an adapter disc for detachable mounting to a screen.

Finally, FIG. 16 shows schematically an adapter disc for detachable mounting on a screen surface.

Such an adapter disc generally has a sandwich structure comprised of multiple discs that are glued together.

The innermost disc, which is closest to the screen surface, is a spacer disc with a thickness of in general approx. 1 mm. This disc ensures that the subsequent lenticular lense has a constant distance from the surface of the screen in all areas of the display. It is followed by a lenticular disc of lenticular lenses that are arranged in parallel. These lenses face the display and generally are positioned diagonally. This is followed by a protective disc, which is glued to the smooth side of the lenticular disc. This disc protects the lenticular disc against scratches and dirt.

Since the spacer disc and the lenticular disc must be in direct contact with the surface of the screen, they are cut to size to fit the display recess.

The protective disc is somewhat larger, generally by approximately 2 cm on each side. Mounting devices and handles for attaching and detaching purposes are fixed to it. The handles each have a small metal plate (monitor plate) that is mounted on the edge of the display and has a guide pin. The guide pin allows the viewer to detach and attach the adapter disc correctly and carefully.

Integrated in the handle are two magnetic clamps. Each magnet is connected to a spring that ensures that the adapter disc is pulled into the display recess. It also controls the different depths of the display recesses of the different display manufacturers.

When the user places the disc on the display, the guide pins guide it along the edge of the display. As soon as the adapter disc is close enough to the monitor plates on the edge of the display, the two magnets on each side automatically pull the disc onto the display with the help of the springs and thus pull the two inside discs (spacer disc and lenticular disc) into the display recess.

When the viewer removes the disc, he must exert enough force to overcome the resistance against the magnets and the springs.

Commercial magnets and springs can optimally be chosen for this.

The design introduced here can be used regardless of individual display manufacturers for all displays of one size.

Of course it is feasible to use other possibilities for mounting and fixing.

The invention claimed is:

1. A method for the calibration of a display unit, comprising a display and an autostereoscopic adapter disc, wherein inaccuracies of the positioning of the adapter disc relative to the display and/or optical parameters of the display unit are compensated or optimized by adjusting the image shown on the display to the actual position of the adapter disc by changing the image in relation to three parameters ($i_{off}$, α, d) by the following steps:

(a) Incrementing or decrementing of a value of at least one of the three parameters of the image and then calculating the perspective (n) for each image element (i, j) in dependence on these parameters, wherein the three parameters represent a shift ($i_{off}$) of the adapter disk in a plane of the display, a rotation (α) of the adapter disk around an axis that is perpendicular to the plane of the display, and a distance (d) of the adapter disc from the display, respectively;

(b) generating a mask ($M_n$(i, j)) for each prospective, wherein the mask is defined to have a value of "1" for each image element which is to be displayed from the respective prospective, and a value of "0" otherwise;

(c) multiplying the image of each prospective (Pn(i,j)) with the mask generated for the respective prospective, and adding the masked perspectives for displaying an image (B(i, j)) on the display; and (d) repeating the steps (a) to (c) for the three parameters, until inaccuracies of the positioning are compensated and/or the optical parameters are optimized.

2. A method according to claim 1,
wherein the number of masks corresponds to the number of perspectives to be displayed.

3. A method according to claim 1,
wherein the distance of the adapter disc from the display is compensated for or optimized by changing the number of pixels or sub-pixel of the image behind at least one lense of the adapter disc.

4. A method according to claim 1,
wherein an undesirable value or an undesirable change of at least one of the parameters is recorded by means of a sensor device, with which the respective change of the image generated on the display is effected.

5. A method according to claim 1,
wherein an optimization or an individual adaptation of the optical parameters to the physical conditions can be conducted by interactively adjusting the parameters by a user.

6. A method according to claim 1,
wherein the perspective according to step (a) is calculated according to formula (1) in the description, namely: $n = (i + i_{off} - 3j \tan \alpha) \mod X * N_{tot}/X$.

7. A method according to claim 1,
wherein the image which is shown on the display is a test image that helps the user to optimize the parameters by carrying out the method.

8. A method for generating or playing back 3D-images by means of a display unit comprising an autostereoscopic adapter disk and a display in which the display is calibrated relative to the attached adapter disc according to a method for the calibration of a display unit, comprising a display and an autostereoscopic adapter disc, wherein inaccuracies of the positioning of the adapter disc relative to the display and/or optical parameters of the display unit are compensated or optimized by adjusting the image shown on the display to the actual position of the adapter disc by changing the image in relation to three parameters ($i_{off}$, $\alpha$, d) by the following steps:
(a) Incrementing or decrementing of a value of at least one of the three parameters of the image and then calculating the perspective (n) for each image element (i, j) in dependence on these parameters, wherein the three parameters represent a shift ($i_{off}$) of the adapter disk in a plane of the display, a rotation ($\alpha$) of the adapter disk around an axis that is perpendicular to the plane of the display, and a distance (d) of the adapter disc from the display, respectively;
(b) generating a mask ($M_n(i, j)$) for each prospective, wherein the mask is defined to have a value of "1" for each image element which is to be displayed from the respective prospective, and a value of "0" otherwise;
(c) multiplying the image of each prospective (Pn(i, j)) with the mask generated for the respective perspective, and adding the masked perspectives for displaying an image (B(i, j)) on the display; and
(d) repeating the steps (a) to (c) for the three parameters, until inaccuracies of the positioning are compensated and/or the optical parameters are optimized.

9. A method to according to claim 8,
wherein each image of a perspective is multiplied with the mask which has been determined for this perspective during the calibration, and wherein the masked perspectives are added for imaging the image on the display.

10. A method to according to claim 8,
wherein the number of perspectives to be imaged can be freely selected by a user and/or dynamically changed, and wherein new masks are automatically generated according to the new number of perspectives.

11. A method to according to claim 8,
wherein the spatial position of viewing zones for a user in front of the display is adjusted or set by the parameter that represents a shift of the adapter disk in a plane of the display.

12. A device for calibrating a display unit comprising a display and an autostereoscopic adapter disk according to a method for the calibration of a display unit, comprising a display and an autostereoscopic adapter disc, wherein inaccuracies of the positioning of the adapter disc relative to the display and/or optical parameters of the display unit are compensated or optimized by adjusting the image shown on the display to the actual position of the adapter disc by changing the image in relation to three parameters ($i_{off}$, $\alpha$, d) by the following steps:
(a) Incrementing or decrementing of a value of at least one of the three parameters of the image and then calculating the perspective (n) for each image element (i, j) in dependence on these parameters, wherein the three parameters represent a shift ($i_{off}$) of the adapter disk in a plane of the display, a rotation (a) of the adapter disk around an axis that is perpendicular to the plane of the display, and a distance (d) of the adapter disc from the display, respectively;
(b) generating a mask ($M_n(i, j)$) for each prospective, wherein the mask is defined to have a value of "1" for each image element which is to be displayed from the respective prospective, and a value of "0" otherwise;
(c) multiplying the image of each prospective (Pn(i, j)) with the mask generated for the respective perspective, and adding the masked perspectives for displaying an image (B(i, j)) on the display; and
(d) repeating the steps (a) to (c) for the three parameters, until inaccuracies of the positioning are compensated and/or the optical parameters are optimized,
the device having an image memory to which the images that are to be displayed are sent, a mask generator for generating the masks, a mask memory for storing the generated masks, and a mask operator for multiplying the perspectives of the image to be displayed with the respective mask.

13. A device according to claim 12,
for the presentation of in particular virtual images, wherein instead of the image memory, a geometry and texture memory and an image generator is provided.

14. A device for generating or playing back 3D images by means of a display unit comprising an autostereoscopic adapter disc and a display, having a device for calibrating the display unit according to claim 12.

15. A non-transitory computer readable medium comprising a computer program with a program code for executing a method or for application in a method according to claim 1.

16. The non-transitory computer readable medium comprising a computer program according to claim 15 that is used for downloading in a device for calibrating a display unit comprising a display and an autostereoscopic adapter disc when it is executed on a computer that is connected to the Internet.

17. Autostereoscopic adapter disc, in particular for the application in a method according to claim 1, wherein the adapter disc comprises lenses in the form of liquid lenses, to which a voltage can be applied to obtain certain pre-definable tense properties, in particular to compensate for misalignments on a display.

* * * * *